United States Patent Office 3,114,660
Patented Dec. 17, 1963

3,114,660
ANODIZED ALUMINUM COLORED WITH WATER INSOLUBLE PHTHALOCYANINE AND METHOD
William C. Cochran, Pittsburgh, Pa., assignor to Aluminum Company of America, Pittsburgh, Pa., a corporation of Pennsylvania
No Drawing. Filed Apr. 16, 1959, Ser. No. 806,738
12 Claims. (Cl. 148—6.1)

This invention relates to aluminum articles having artificially-produced oxide coatings which are impregnated with water-insoluble organic colorants, and to methods of treating oxide coatings on aluminum so as to color the same with water-insoluble organic colorants. As used herein, the word "aluminum" includes pure aluminum, commercial aluminum of various grades and aluminum base alloys.

The invention particularly relates to a new and unique method of coloring oxide coatings on aluminum, in which the oxide coatings are colored with water-insoluble organic colorants soluble in acid-pasting acid, such as a phthalocyanine pigment, a vat dye, or the like. Despite the fact that such organic colorants are insoluble in water (and generally also in most organic solvents), a novel method has been found for introducing the same into aluminum oxide coatings. Such a method is of great utility because the lightfastness of water-insoluble organic colorants is generally substantially greater than that of corresponding water soluble dyes.

The coloring of oxide coatings on aluminum with water-soluble dyes or with inorganic pigments has long been known. Dyes are usually adsorbed in oxide coatings from water solutions thereof, producing colored articles in one step. The process is similar to the dyeing of textiles. Inorganic pigments are sometimes formed within the pores of oxide coatings by multi-step procedures in which pigment substituents from two different aqueous solutions enter into a reaction in the coating. Also, some inorganic pigments are introduced into oxide coatings from aqueous solutions of their compounds, by precipitation and hydrolysis. Thus, in the commonly used methods for coloring aluminum oxide coatings, water-soluble materials are used. These methods have not been applicable to coloring with water-insoluble organic colorants. In fact, no satisfactory way to impregnate and color oxide coatings with water-insoluble organic colorants soluble in acid-pasting acid has been known in the prior art.

It may be noted that one of the best blue dyes for oxide coatings is a copper phthalocyanine sulfonic acid or the sodium salt thereof, but these are water-soluble dyes. The unsulfonated copper phthalocyanine pigment, however, exhibits greater resistance to light and, when introduced into oxide coatings by the methods described herein, has been found to be very lightfast and weatherfast. The colors obtained with various phthalocyanine pigments usually range from blue to green, colors heretofore considered difficult to produce in oxide coatings on aluminum with an acceptable degree of lightfastness, weatherfastness, tinctorial strength and brightness, especially in light shades. With other organic pigments and vat dyes, a wide variety of colors may be obtained in oxide coatings on aluminum with exceptional lightfastness and weatherfastness.

The invention has for its general object the coloring of oxide coatings on aluminum with water-insoluble organic colorant, and the production of lightfast colored oxide coatings on aluminum for architectural, automotive, and other decorative applications, either indoors or outdoors. Such coatings may be so colored as to resist fading on exposure to light and weathering, and it is an object of the invention to provide a method of so doing.

In accordance with the invention, the aluminum article to be colored is one which has first been provided with an artificially-produced oxide coating. Such coatings are porous and adsorbent. They may be formed, by several known methods, to various thicknesses suitable for retention of the desired amount of adsorbed colorant. For example, an adsorbent oxide coating may be produced chemically, by treating the aluminum surface in an alkaline carbonate solution. Preferably, however, an electrolytic (anodic) oxide coating is employed, such as may be formed by making the aluminum article anode in a sulfuric, chromic or oxalic acid solution. The chemical or electrolytic coating is left unsealed, and is preferably dried, prior to coloring.

It has been found that, in accordance with the invention, artificially-produced oxide coatings on aluminum may be impregnated and thereby colored with water-insoluble colorant as follows. The coating is first treated with a solution of the colorant in an acid-pasting acid, by dipping, flowing, roller coating, spraying or similar techniques. Some of the solution clings to the coating and, at this point the coating simply exhibits the color of the solution. The coating is subsequently treated with a colorant-drowning diluent, by dipping, pouring, spraying or similar techniques, so that the adsorbed solution is diluted and the organic colorant is insolubilized in the coating, which then exhibits the desired color. Then, the organic colorant is adsorbed and retained by the coating, and may be considered to be regenerated in the pores of the coating wherein it is deposited from the concentrated acid solution. Even in the case of anodic oxide coatings which have a well-defined, sub-microscopic pore structure, the coating appears to be impregnated and colored substantially throughout its pore structure.

The acid-pasting acid may be one of those commonly used heretofore for so-called acid-pasting of organic pigments or vat dyes during their manufacture, from which an organic pigment or vat dye of desired purity, particle size, or tinctorial strength may be obtained by a so-called drowning step. In the conventional acid-pasting technique employed for particle size reduction or the like, organic colorant is first dissolved in concentrated sulfuric acid or equivalent acid-pasting acid and then the solution is rapidly diluted to regenerate the colorant in small particles by precipitation. However, this technique has been used heretofore merely for modifying the physical properties of organic colorants, as distinguished from being used as part of a method of coloring. In the practice of the invention, an acid-pasting acid such as sulfuric acid of about 90% strength or greater (including so-called fuming sulfuric acid or oleum) is conveniently used as the solvent for the colorant. However, any concentrated acid-pasting acid, preferably of at least about 75% or greater concentration, may be selected from the conventional acid-pasting acids such as sulfuric acid (or oleum), phosphoric acid, trichloroacetic acid and chlorosulfonic acid (or mixtures thereof). Such acids are more effective as solvents for the colorant the greater their concentration. Various materials reducing the viscosity of the solution, and other additions to the acid-pasting solution may also be present, such as acetic acid or diethylene glycol monoethyl ether.

The temperature of the acid-pasting acid solution as used is conveniently room temperature, although the rate of dissolution of the colorant may be increased by heating. The use of oleum at very high temperatures is not recommended, however, because of the increased tendency toward sulfonation of the colorant under such conditions.

The time of treatment with the acid-pasting acid solution need be only momentary, but sufficient to cover or contact all portions of the coating surface to be colored. Usually at least a few seconds are required for complete coverage of the coating, whether the solution is sprayed or flowed on the coating, or the coated article is dipped or immersed in the solution. Somewhat longer contact time is usually unavoidable and in some cases it appears to aid in obtaining deep and uniform coloring.

The concentration of colorant in the acid-pasting acid may be varied widely, according to the depth of color desired in the coating. For pastel shades, 5 or 10 grams per liter are usually more than sufficient. For deeper shades 50 or more grams per liter appear to be desirable. A concentration beyond that soluble in the acid does not seem to be desirable, as the colorant may desirably be fully dissolved or any undissolved excess filtered off, in order to promote uniformity of coloring.

The organic colorant dissolved in the acid solution employed may be any water-insoluble organic pigment or like coloring matter, such as a phthalocyanine pigment or a vat dye. The useful phthalocyanines include metal-free phthalocyanine as well as the metal phthalocyanines, of which the sulfuric acid-stable copper and nickel phthalocyanines are outstandingly lightfast examples. These pigments, or other water-insoluble substitution derivatives of phthalocyanines, generally produce blue colors. Green colors, on the other hand, may be obtained with chlorinated phthalocyanine pigments such as polychlorinated copper phthalocyanine. The compounds commonly referred to as vat dyes may be any of the water-insoluble anthraquinone or related quinonoid dyes or any of the indigoid or thioindigoid dyes, among which are a wide variety of lightfast colorants, a number of examples of which appear below and in the co-pending joint application, Serial No. 806,739, filed April 16, 1959, now U.S. Patent No. 3,058,855, by Ben H. Kirby, Jr., and the applicant herein.

The colorant-drowning diluent most readily applicable to the process of this invention is water or water vapor. It may be flowed or sprayed over the coating, or the coated article may be dipped or immersed therein. Water spraying is preferred, in order to obtain the quickest drowning-out of the organic colorant throughout the coating, and consequent uniformity of coloring. There is no harm, of course, in using a somewhat acidified water, other aqueous liquids or even an organic diluent, so long as the solubility of the colorant in the acid-pasting acid solution is thereby reduced with consequent insolubilization of the colorant in the coating. The effective time of treatment with the drowning diluent is, of course, short. The dilution takes place as the diluent contacts the coating, and an entire article may be treated in a few seconds. A prolonged drowning treatment is of no particular benefit, and a slow application of drowning diluent is usually undesirable since it may tend to make the final color non-uniform.

It is a common practice to seal an oxide coating on aluminum, as by immersing the coated article in boiling water or dilute nickel acetate solution. After coloring with organic colorant in accordance with the invention, the colored coating may be sealed by such an after treatment. Prior to coloring, the coating may be treated with nitric acid, and dried, in order to improve the adsorptive capacity of the coating. Whether so treated or not, it is preferred that superficial moisture be dried out of the coating so that adsorption of the acid-pasting acid and colorant is not hindered, and irregular or premature precipitation of colorant does not occur.

Aluminum articles having oxide coatings impregnated and colored with water-insoluble organic colorant have the desirable properties of lightfastness and weatherfastness associated with the particular colorant employed. Coatings so colored are characterized by resistance to substantial color change as determined by tests in the Atlas Electric Devices Company Fade-O-Meter, Type FDA-R, for substantially longer times than coatings colored by conventional dyes of similar hue.

The following examples will illustrate the invention.

Example 1

A 4" x 6" panel of aluminum alloy sheet with a 5 percent silicon alloy cladding was given a caustic etch and then was anodically coated for 30 minutes in a 15% by weight sulfuric acid electrolyte at a temperature of 21° C. and with a current density of 24 amperes per square foot. After being given the anodic coating, the panel was rinsed with water and was dried by means of a blast of compressed air. The panel was then immersed for 10 minutes in a 2 liter solution containing 19 grams per liter of copper phthalocyanine (C.I. Pigment Blue 15) dissolved in 96% sulfuric acid. The temperature of the acid solution was 85 to 90° C. After the panel was removed from the acid solution it was immersed in cold water. The surface was wiped off and the panel was sealed by boiling it in distilled water for 10 minutes. The anodic coating was colored turquoise blue after the immersion in cold water.

Example 2

A piece of aluminum sheet of 99.3% purity was anodically coated for 63 minutes in a 15% sulfuric acid electrolyte at a temperature of about 25° C. with a current density of 12 amperes per square foot. The sample was then rinsed with water and was immersed for 5 minutes in a 50% nitric acid solution at room temperature. The sample was again rinsed with water and then was dried with a blast of compressed air. The sample was immersed for one minute in a solution consisting of approximately 45 grams per liter (5 grams to 390 grams) of chlorinated copper phthalocyanine (C.I. Pigment Green 7) dissolved in chlorosulfonic acid. The acid solution was used at room temperature. After removing the sample from the acid solution the sample was plunged into water. The anodic coating on the sample was colored an attractive bright green color by this procedure.

Example 3

A specimen of 1100–H14 aluminum sheet was anodically coated for 60 minutes in 15% sulfuric acid electrolyte at a temperature of 22° C. with a current density of 12 amperes per square foot. It was then rinsed in water and immersed for 5 minutes in a 50% nitric acid solution at room temperature. Next it was rinsed with water and dried with a blast of compressed air. It was then immersed for 2 minutes in a solution of 60 grams per liter copper phthalocyanine dissolved in 10% orthophosphoric acid. The acid solution was at room temperature. After removal from the acid solution the specimen was "drowned" in running tap water. When the excess pigment was wiped from the surface, the anodic coating was found to be colored light blue. Finally, the colored specimen was sealed in boiling distilled water for 10 minutes.

Example 4

A specimen of aluminum sheet of 99.3% purity anodically coated for 32 minutes in a 130 gram per liter chromic acid electrolyte at 54° C. using 21 volts. It was then rinsed in water and immersed for 5 minutes in 50% nitric acid solution at room temperature. After rinsing and drying, the specimen was immersed for 5 minutes at room temperature in a solution of 96% sulfuric acid which contained 60 grams per liter of dissolved copper phthalocyanine. The specimen was then "drowned" in running tap water. The anodic coating was found to be colored blue. It was sealed in boiling water.

Example 5

A specimen of 1100 aluminum was given a chemical conversion coating by immersion for 20 minutes in a solution of 2% NaCO₃ and 0.1% K₂Cr₂O₇ at 90° C. It was dried and then immersed for 2 minutes at room temperature in a solution of 96% sulfuric acid containing 60 grams per liter of dissolved copper phthalocyanine. After drowning in water, the coating was found to be colored gray blue.

*Example 6*

A piece of high purity aluminum-magnesium-silicon alloy extrusion was anodically coated in a sufuric acid electrolyte. The coated piece was immersed for 30 seconds in 50% nitric acid solution at room temperature, followed by rinsing in water. The piece was then blown dry with compressed air. Next, the piece was immersed for 2 minutes in a 50 grams per liter solution of metal free phthalocyanine (C. I. Pigment Blue 16) in 96% sulfuric acid. While still wet with the acid pasting solution, the sample was drowned in running water. A uniform, light blue color was produced in the anodic coating. Finally, the colored sample was sealed for 5 minutes in boiling 2 grams per liter nickel acetate solution.

*Example 7*

Another piece of high purity alloy extrusion was given the same treatments as described in the above example 6 except that it was colored by immersion for 2 minutes in a 75 grams per liter solution of nickel phthalocyanine in 96% sulfuric acid. Upon drowning in water, the anodic coating was colored a uniform deep blue shade.

*Example 8*

Another piece of high purity alloy extrusion was anodized, rinsed and dried as in the above examples 5 and 6. It was immersed for 2 minutes in a 50 grams per liter solution of copper phthalocyanine in 96% sulfuric acid. It was then drowned in a used 15% sulfuric acid anodizing electrolyte. A slightly variegated blue color was produced in the anodic coating. The coating was sealed for 5 minutes in boiling 2 grams per liter nickel acetate solution.

*Example 9*

A piece of aluminum sheet of 99.3% purity was anodically coated for 60 minutes in 4% oxalic acid electrolyte at 27° C., 12 amperes per square foot current density, and 47 to 53 volts D.C. The coated piece was immersed for 5 minutes in 50% nitric acid solution at room temperature and then rinsed with water. It was blown dry with a blast of compressed air. Next, it was immersed for 15 seconds in 96% sulfuric acid solution containing 50 grams per liter of dissolved copper phthalocyanine. While still wet with the acid pasting solution, the piece was drowned in water. The anodic coating was colored a uniform deep blue shade. Finally, it was sealed for 10 minutes in boiling 2 grams per liter nickel acetate solution.

*Example 10*

A piece of aluminum sheet of 99.3% purity was anodically coated for 60 minutes in 4% oxalic acid electrolye at 35° C., 12 amperes per square foot and 50 volts D.C. It was immersed for 5 minutes in 50% nitric acid solution at room temperature, rinsed with water and blown dry with compressed air. Next it was immersed for 3 minutes in a 5% solution of copper phthalocyanine in trichloroacetic acid at a temperature of 66° C. While still wet with the acid pasting solution, the specimen was drowned in water. A light blue, variegated coloration of the anodic coating was produced. The coating was then sealed for 10 minutes in boiling 2 grams per liter nickel acetate solution.

*Example 11*

Panels of 99.3% purity aluminum were oxide coated by being made anode in 15% sulfuric acid electrolyte at 70° F., with a current density of 12 amperes per square foot, for 63 minutes. They were colored in pastel shades by being immersed for 5 minutes at room temperature in concentrated sulfuric acid solutions containing 20 grams per liter of the various vat dyes listed immediately below and then being immersed in cool water. They were thereafter rinsed, dried and sealed for 10 minutes in boiling water. The organic colorants used and the color imparted to the coatings were as follows:

| Colorant— | Color in coating |
|---|---|
| Anthrimidecarbazole (C.I. Vat Brown 3) | Pale bronze. |
| Dimethoxydibenzanthrone (C.I. Vat Green 1) | Bluish green. |
| Pyranthrenedione (C.I. Vat Orange 9) | Pink gold. |
| Dichloranthraquinonediazine (C.I. Vat Blue 6) | Purple blue. |
| Anthraquinoneoxazole (C.I. Vat Red 10) | Pale pink. |

*Example 12*

Panels of oxide coated aluminum and aluminum alloys similar to those of Example 11 were immered in 96% sulfuric acid solution, at room temperature, containing from 10 to 80 grams per liter of the organic colorants listed immediately below. They were then drowned in a spray of cold water. The pigments used and colors obtained were as follows:

| Colorant— | Color in coating |
|---|---|
| Anthraquinonedibenzthiazole (C.I. Vat Yellow 2) | Pale yellow. |
| Dibromoindigo (C.I. Vat Blue 35) | Pale blue. |
| Dibenzanthrone (C.I. Vat Blue 20) | Light blue. |
| Quinacridone (DuPont's Monastral Red) | Red violet. |

The foregoing examples illustrate the wide variety of oxide coatings on aluminum to which the invention is applicable, and a number of variations in the new coloring techniques that may be employed. While some of the examples refer to immersion of the coated panels in the acid solution or in the drowning diluent, application of the acid solution by flowing it onto the oxide coating or by spraying it are also convenient and economical methods of treating the coating, especially on large aluminum articles. Application of the drowning diluent may also be very effectively made if sprayed or flowed onto the coating.

Numerous modifications of the invention, and various applications thereof, within the scope of the following claims, will be apparent from the foregoing.

What is claimed is:

1. An aluminum article having an anodic oxide coating which is impregnated and colored with water-insoluble phthalocyanine pigment soluble in acid-pasting acid and precipitatable therefrom by drowning.

2. An aluminum article having an anodic oxide coating which is impregnated and colored with sulfuric acid-stable metal phthalocyanine.

3. An aluminum article having an anodic oxide coating which is impregnated and colored with chlorinated copper phthalocyanine.

4. An aluminum article having an anodic oxide coating which is impregnated and colored with copper phthalocyanine.

5. An aluminum article having an anodic oxide coating which is impregnated and colored with nickel phthalocyanine.

6. A method of coloring an artificially-produced oxide coating on an aluminum article with water-insoluble organic colorant, which comprises treating the oxide coating with a solution of water-insoluble organic colorant in acid-pasting acid, and subsequently treating the oxide coating with colorant-drowing diluent.

7. A method of impregnating an artificially-produced oxide coating on an aluminum article with phthalocyanine pigment, which comprises treating the oxide coating with a solution of phthalocyanine pigment in acid-pasting acid, and subsequently treating the oxide coating with pigment-drowning diluent.

8. A method of impregnating an anodic oxide coating on an aluminum article with water-insoluble organic colorant, which comprises treating the oxide coating with a solution of sulfuric acid-stable, water-insoluble organic colorant in concentrated sulfuric acid, and subsequently treating the oxide coating with colorant-drowning diluent.

9. A method of impregnating an anodic oxide coating on an aluminum article with phthalocyanine pigment, which compirises treating the oxide coating with a solution of sulfuric acid-stable metal phthalocyanine pigment in concentrated sulfuric acid, and subsequently treating the oxide coating with pigment-drowning diluent.

10. A method of impregnating an anodic oxide coating on an aluminum article with phthalocyanine pigment, which comprises treating the oxide coating with a solution of metal phthalocyanine pigment in acid-pasting acid, and subsequently treating the oxide coating with aqueous pigment-drowning diluent.

11. A method of impregnating an anodic oxide coating on an aluminum article with phthalocyanine pigment, which comprises treating the oxide coating with a solution of copper phthalocyanine pigment in concentrated sulfuric acid, and subsequently treating the oxide coating with aqueous pigment-drowning diluent.

12. A method of impregnating an anodic oxide coating on an aluminum article with phthalocyanine pigment, which comprises treating the oxide coating with a solution of nickel phthalocyanine pigment in concentrated sulfuric acid, and subsequently treating the oxide coating with aqueous pigment-drowning diluent.

References Cited in the file of this patent

UNITED STATES PATENTS

| | | |
|---|---|---|
| 2,132,620 | Hill et al. | Oct. 11, 1938 |
| 2,785,098 | Cunningham et al. | Mar. 12, 1957 |
| 2,814,576 | Zickendraht et al. | Nov. 26, 1957 |
| 2,897,039 | Baumann et al. | July 28, 1959 |
| 2,908,544 | Randall et al. | Oct. 13, 1959 |
| 2,925,423 | Weinmayr | Feb. 16, 1960 |
| 2,975,081 | Kirby | Mar. 14, 1961 |
| 3,026,220 | Sowards | Mar. 20, 1962 |

FOREIGN PATENTS

| | | |
|---|---|---|
| 542,138 | Great Britain | Dec. 29, 1941 |
| 593,239 | Great Britain | Oct. 13, 1947 |